United States Patent [19]
Slavenburg

[11] Patent Number: 5,815,701
[45] Date of Patent: Sep. 29, 1998

[54] COMPUTER METHOD AND APPARATUS WHICH MAINTAINS CONTEXT SWITCHING SPEED WITH A LARGE NUMBER OF REGISTERS AND WHICH IMPROVES INTERRUPT PROCESSING TIME

[75] Inventor: Gerrit Ary Slavenburg, Los Altos, Calif.

[73] Assignee: Philips Electronics North America Corporation, New York, N.Y.

[21] Appl. No.: 496,630

[22] Filed: Jun. 29, 1995

[51] Int. Cl.$^6$ .......................................... G06F 9/42
[52] U.S. Cl. .......................... 395/591; 395/670; 395/678; 395/569; 395/580; 395/581
[58] Field of Search ................... 395/820, 678, 395/569, 591, 670, 580, 581

[56] References Cited

U.S. PATENT DOCUMENTS

| | | | |
|---|---|---|---|
| 5,161,226 | 11/1992 | Waiher | 395/737 |
| 5,179,702 | 1/1993 | Spix | 395/672 |
| 5,530,866 | 6/1996 | Koblenz et al. | 395/708 |
| 5,619,408 | 4/1997 | Black et al. | 395/567 |
| 5,628,013 | 5/1997 | Anderson et al. | 395/677 |

FOREIGN PATENT DOCUMENTS

0511769A1  11/1992  European Pat. Off. .

OTHER PUBLICATIONS

"SPARC Revealed : A close look at Suns . . . Workstation," BYTE, Apr. 1991, pp. 1–7.
Mann, Daniel, "Speed System . . . Embedded–System Applications," Electronic Design, Nov. 2, 1992, pp. 1–9.
Case, "SPARC V9 . . . Revamped Trap Model," Microprocessor Report, Feb. 15, 1993, pp. 1–10.

*Primary Examiner*—Larry D. Donaghue
*Assistant Examiner*—John Follansbee
*Attorney, Agent, or Firm*—Anne E. Barschall

[57] ABSTRACT

Registers are divided into a global pool and a local pool. Code to be used in the processor must allocate registers from the global pool for values that live across decision trees and from the local pool for local values. The processor only accepts interrupts and exceptions during successful inter decision tree jumps. The code signals such jumps with special interruptable jump operations. To put a ceiling on clock cycles between interruptable jumps, each loop should have at least one successful interruptable jump and/or backwards jumps should be interruptable. The interrupt and exception handlers use only registers from the local pool. During a context switch, only contents of the global pool are saved in the task record.

28 Claims, 8 Drawing Sheets

COMPUTER METHOD AND APPARATUS WHICH MAINTAINS CONTEXT SWITCHING SPEED WITH A LARGE NUMBER OF REGISTERS AND WHICH IMPROVES INTERRUPT PROCESSING TIME

RELATED APPLICATIONS

The following related patents and patent applications are incorporated by reference:

U.S. application Ser. No. 358,127 (PHA 1268) filed Dec. 16, 1994;

U.S. application Ser. No. 366,958 filed Dec. 30, 1994 (PHA 21932);

U.S. patent application Ser. No. 998,080 filed Dec. 29, 1992 (PHA 21,777);

U.S. Pat. No. 5,450,556 (PHA 1205);

U.S. Pat. No. 5,692,139 (PHA 1209);

U.S. Pat. No. 5,313,551 (PHA 1211); and

U.S. Pat. No. 5,103,311 (PHN 12,376).

BACKGROUND OF THE INVENTION

1. Field of the Invention

The invention relates to the field of computer processors and in particular to implementing context switching within such processors.

2. Related Art

In designing processors, there are a number of cost/performance tradeoffs. Higher performance often comes at the expense of interrupt overhead, interrupt latency, and context switch degradations.

FIG. 1 shows a traditional computer. A CPU (central processing unit) 101 executes tasks, interacting with a memory 104, via a bus 103. The memory 104 provides an instruction stream to the CPU 101. Also attached to the bus 103 are peripherals, e.g. 102. When the CPU receives an interrupt, at line 105, it can communicate over the bus 103 with the peripherals, e.g. 102. The peripherals are typically i/o (input and/or output) devices. The interrupts are asynchronous and arise with frequencies from 500 Hz to 100 kHz, depending on the nature of the application. Real time applications, such as video compression and decompression require interrupt rates towards the upper end of this range. Multimedia processing also requires frequent interrupts and context switching between processing different types of media, such as video and audio. There is some performance degradation with each interrupt, known as interrupt overhead. In order to support such real time applications, the processor must guarantee some maximum time between assertion and handling of an interrupt, i.e. a maximum interrupt latency.

Modern processors typically implement multi-tasking. FIG. 2 shows a timing diagram of a multi-tasking environment. In this environment, task 1 is swapped out, after an interval of time, in favor of task 2. Task 2 is then swapped out after an interval of time in favor of task 3. Task 3 is then swapped out, after a third interval of time in favor of task 1 again. With each swap, the processor must perform a context switch. As stated above, the primary reasons for swapping are expiration of a time slice allocated to a current task; the current task being voluntarily blocked, e.g. seeking i/o (input and/or output); or an interrupt freed a higher priority task, which will be discussed in more detail below.

During the context switch, the processor stores a data structure in memory 104 as illustrated in FIG. 3. This data structure includes a pointer 301, known as a "task handle" or "task i.d.". The pointer points to the location of the task record 302 which includes fields for the content of all registers in the processor 101, the stack pointer 304, the frame pointer 305, and the program control and status word PCSW 306.

To increase processor performance, the designer can add registers or increase cache size. Historically, INTEL chips had 8 registers. Newer RISC chips have 32. While further increasing the number of registers should theoretically improve performance, performance degrades because more data must be stored during a context switch. As a result, the context switch takes longer. Where there are frequent context switches, as in multimedia processing, performance is seriously impacted.

One prior solution to the problem of lengthy context switches was the so-called "lightweight context switch". This idea was a partial solution which works only in the case of the current task being blocked (also called "voluntary block"). In the case of a voluntary block, the task is interrupting itself. Accordingly, it knows which registers it is using and causes the task record to contain the contents of those registers, and only those registers, which the task is actually using. The lightweight context switch offers no advantages with the other two types of context switches, i.e. time slice expiration and higher priority tasks being freed.

This leaves room for additional improvements that work more generally in the case of all types of context switches.

SUMMARY OF THE INVENTION

It is therefore an object of the invention to further reduce context switch time, so that performance can be maintained as the number of registers increases. It is a further object of the invention to reduce interrupt overhead.

These objects are achieved using intertwined hardware and software rules.

BRIEF DESCRIPTION OF THE DRAWING

The invention is described by way of non-limitative example by reference to the following figures.

DETAILED DESCRIPTION OF THE PREFERRED EMBODIMENT

As explained above, performance increases with more registers. A large number of registers, such as 128 should theoretically give a great increase in performance. But if each context switch requires the storing of all registers, performance will deteriorate in a multi-tasking environment.

In order to avoid storing all registers with each context switch a number of hardware and software rules are adopted.

Figure 1:
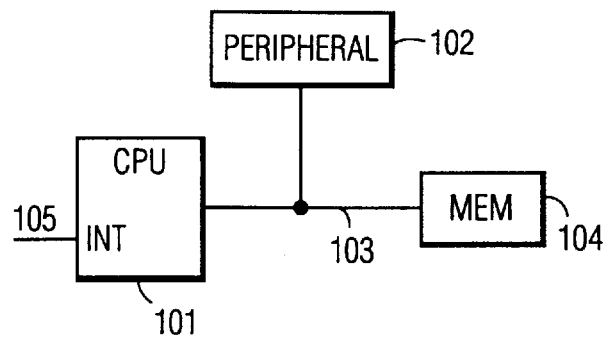
FIG. 1 shows a prior art computer processor.
Figure 2:
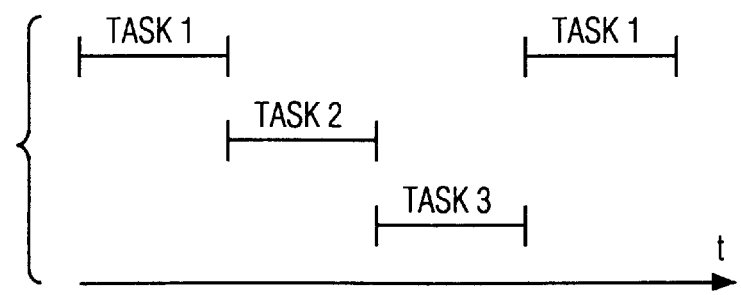
FIG. 2 is an illustration of timing of task swapping in a prior art multi-tasking environment.
Figure 3:
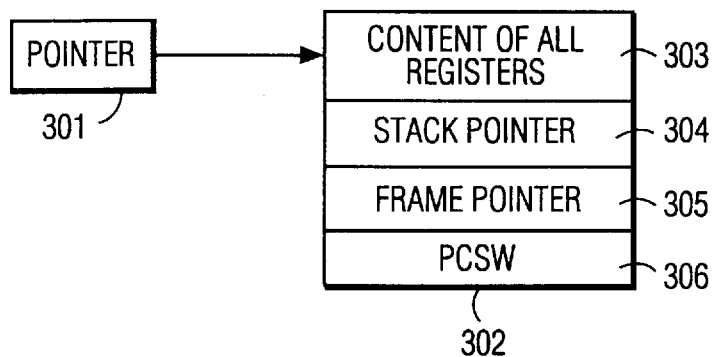
FIG. 3 shows a prior art task record and task handle.
Figure 4:
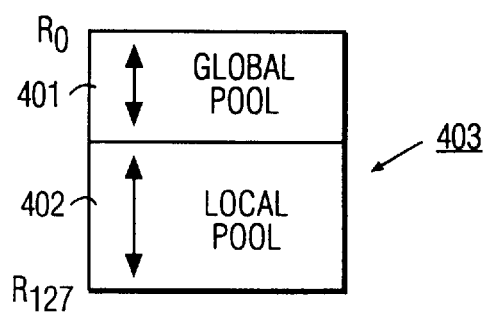
FIG. 4 shows a register file according to the invention.

First, as shown in FIG. 4, the register file 403 is divided into pools or subsets. The first pool is a global pool 401 and the second pool is a local pool 402.

Figure 5:
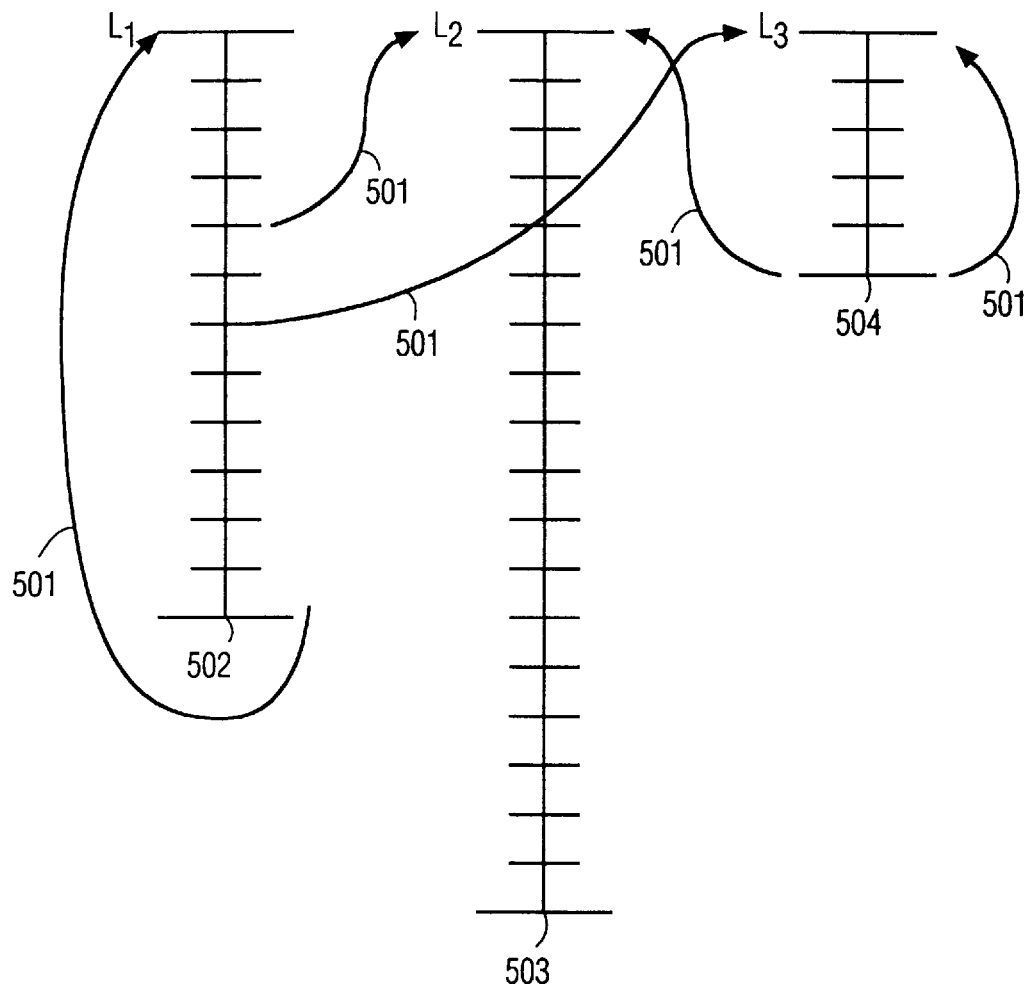
FIG. 5 shows prior art decision trees.

The code in the instruction stream is assumed to be structured into "decision trees", also known as extended basic blocks. Decision trees are code segments which have a single entry point and one or more exit points. FIG. 5 illustrates three decision trees 502, 503, and 504 in memory. Entry points to the decision trees are labelled L1, L2, and L3. Exit points 501 from the decision trees are effected by jump instructions. Decision trees give rise to global and local variables. The global variables "live across decision trees", i.e. can be used in more than one decision tree. The local variables only exist inside a single decision tree.

Pursuant to the invention, during program execution, the code must observe a rule. Namely, global values must be stored in the global register pool, while local values must be stored in the local register pool. The code can be generated to observe this rule either by a human programmer or by an automatic compiler.

Moreover, the hardware must observe a rule that interrupts will only be taken during successful inter decision tree jumps.

Interrupts trigger the two kinds of context switches which are not currently dealt with by the lightweight context switch. These two types are those caused by time slice expiration and interrupts freeing higher priority task. During successful inter decision tree jumps, the local values are lost. Interrupts, according to the invention, can only occur during successful inter decision tree jumps. Accordingly, as a result of the invention, for these context switches that are triggered by interrupts, only the global values need to be saved. Thus, the rule of the invention, that the hardware can only take interrupts during successful inter decision tree jumps, means that lightweight context switches can be extended to all types of context switches.

According to the invention, inter decision tree jumps are signalled in the code by special interruptable jump operations. An operation set according to the invention should contain both interruptable and non-interruptable jumps. For instance, an operation set might contain jmpf (jump on false), jmpt (jump on true), and jmp (unconditional jump), as non-interruptable jumps; and ijmpf (interruptable jump on false), ijmpt (interruptable jump on true), and ijmp (interruptable unconditional jump), as interruptable jumps. The conditional jumps in such an operation set require two operands, while the unconditional jumps require only one operand. Steps performed by these operations are as listed below.

Below, the operands are listed as register names. R13 and R14 are the names chosen. R13 is the register where the condition to be tested is stored. R14 is the register where the jump destination address is stored. These are only examples. Any of these jump operations can use any register as any operand. Alternatively, where R14 is listed, a jump destination address might be used directly, rather than having the jump destination address retrieved from a register. The abbreviation PC is used here to mean "program counter". The abbreviation DPC is used to mean "destination program counter".

```
jmp R13
    PC := R13
jmpf R13 R14
    If R13 = 0
    then PC := R14
    else PC:= PC+1
jmpt R13 R14
    if R13 ≠ 0
    then PC:=R14
    else PC:=PC+1
ijmp R14
    if interrupt pending
    then DPC := R14
        PC:= interrupt handler address
    else PC := R14
ijmpf R13 R14
    if R13 = 0
    then if interrupt pending
        then DPC := R14
            PC:= interrupt handler address
        else PC := R14
    else PC:= PC+1
ijmpt R13 R14
    If R13 ≠ 0
    then if interrupt pending
        then DPC := R14
            PC:= interrupt handler address
        else PC := R14
    else PC:=PC+1
```

In practice only one non-interruptable conditional jump instruction is likely to be necessary to successful programming of the processor.

The ordinary jump instructions here are conventional. The interruptable instructions are new. All of the interruptable jump instructions have in common the steps of the interruptable unconditional jump.

Herein a jump will be called successful if it is an unconditional jump or if it is a conditional jump whose conditions are satisfied. As stated above, interrupts are only taken during successful inter decision tree jumps.

Figure 6:
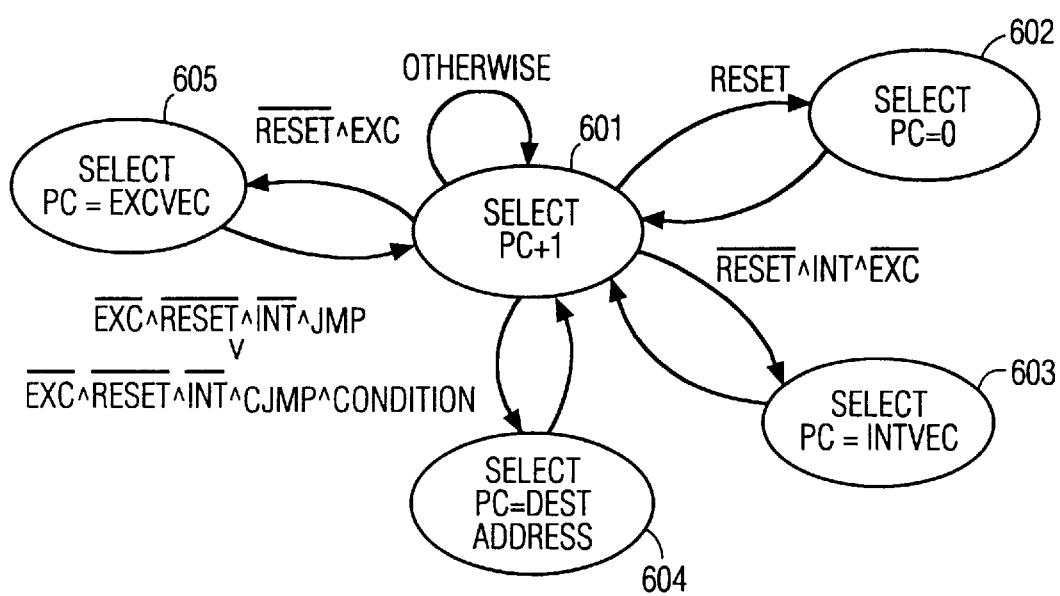
FIG. 6 shows a state diagram of a prior art jump instruction.

FIG. 6 shows a state machine for handling prior art jump operations, e.g. jmp, jmpt, and jmpf. The ordinary state of the machine at 601 is that the program counter (PC) is incremented one count at a time. If the machine receives an reset, the machine resets the program counter to zero at 602. If no reset is received, the other states 603, 604, and 605 are possible. For instance, if an interrupt is received, but no exception and no reset, then the program counter is set to the interrupt vector (INTVEC). If no reset is received and an exception is received, then the program counter is set to the exception vector (EXCVEC) at 605. If no reset, interrupt, or exception is received, then a jump can be processed at 604 either if it is an unconditional jump (jmp) or a conditional jump having its condition met. In the figures, the term "cjmp" is used to mean any kind of conditional jump, i.e. either a jump on true or a jump on false. Also, in the figures the term "condition" is used to mean that the condition of the conditional jump is satisfied. State 604 symbolizes a successful jump, in which the program counter is set to the destination address of the jump. At the end of each of states 602, 603, 604, and 605, control returns unconditionally to state 601.

Figure 7:
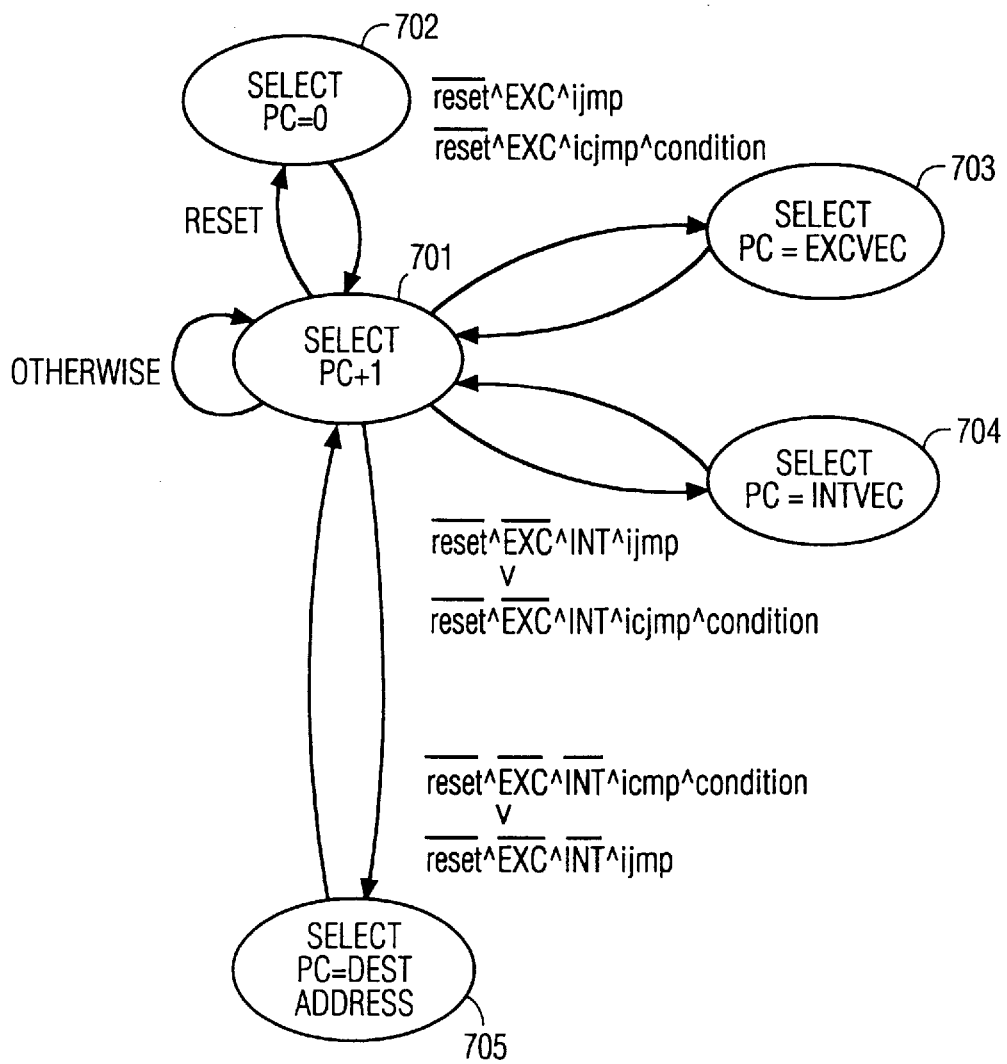
FIG. 7 shows a state diagram of an interruptable jump instruction in accordance with the invention.

FIG. 7 shows a state machine for processing interruptable jump operations in accordance with the invention. Again, the normal state 701 of the machine is that the program counter is incremented one count at a time. If there is a reset, state 702 is selected. If there is no reset but there is an exception, then the exception vector (EXCVEC) is loaded into the program counter at 703.

Optionally, the machine can follow the rule that exceptions are to be handled only during interruptable jump instructions. As with interrupts, this option has the advantage that less registers need to be saved for each exception. The exception handler is not shown herein, because it is essentially identical to the interrupt handler.

If there is an interrupt, along with no exception or reset, then the machine proceeds to state 704 only if there is a successful interruptable jump. In the figure, icjmp is shorthand meaning ijmpt or ijmpf. Again the term "condition" in the figure is used as shorthand to mean that the respective condition of the interruptable conditional jump is satisfied. Again an unconditional jump is always successful, but a conditional jump is only successful if the respective condition is satisfied. The machine proceeds to the destination address of the interruptable jump at 705 only if there is no reset, no exception, no interrupt, and either an unconditional jump or a conditional jump whose condition is satisfied. Again, control returns unconditionally to the state 701 after any of the states 702, 703, 704, and 705 is completed.

Specific circuitry to implement the jump instructions of the state machines of FIGS. 6 and 7 is derived from the state diagrams according to conventional state machine design techniques as a matter of design choice. Specific circuitry can be allocated to various parts of a processor in whatever way might best optimize the overall circuitry of the processor, for instance in accordance with Karnaugh map techniques.

The compiler or the programmer determines whether to use an interruptable jump or a conventional jump. Only the compiler or the programmer knows whether the jump is an inter decision tree jump.

The rule of the invention that context switches can only occur during interruptable jumps makes it possible for context switches to be lightweight context switches, as explained above. However, this rule has an additional advantage of reducing interrupt overhead. Since all the local variables are lost during an inter decision tree jump, the interrupt processor can automatically use the local registers for its own processing. This avoids saving register contents during interrupt processing.

Figure 8:
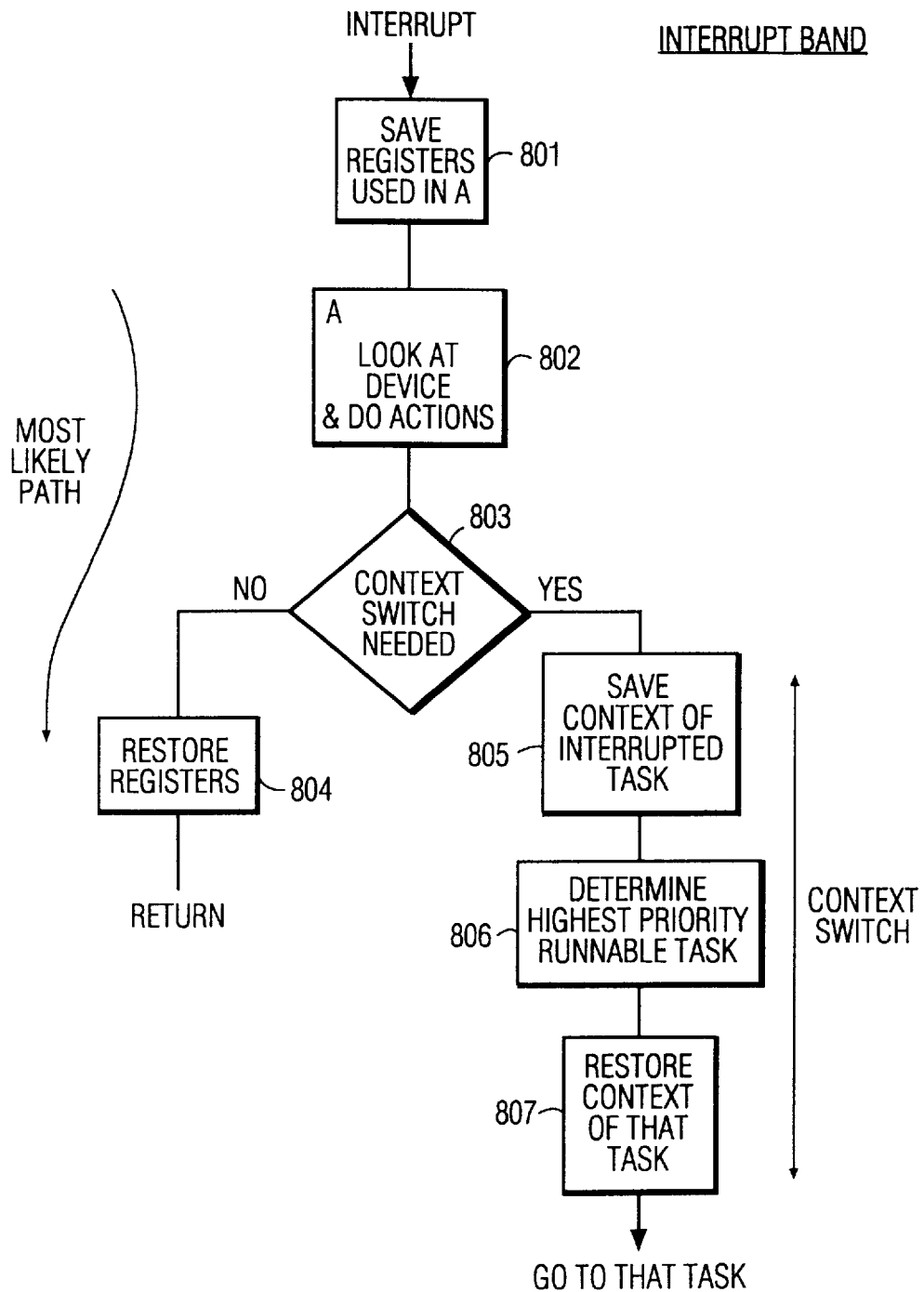
FIG. 8 shows a flow chart of a prior art interrupt handler.

A flow chart of a prior art interrupt handler is shown in FIG. 8. Interrupt handlers are software routines which are triggered by the interrupt controller. At 801, in response to an interrupt, the interrupt handler needs to save the contents of the registers that were used in the interrupted task, but which also need to be used by the interrupt handler. At 802, the interrupt handler looks at the interrupting device and takes care of whatever action A needs to be taken. Then, at 803, the interrupt handler determines whether a context switch is necessary as a result of the action A. If no context switch is needed, then the registers saved in 801 are restored at 804. If a context switch is needed, the context of the interrupted task must be saved at 805. Then, at 806, the interrupt handler has to determine the highest priority runnable task, and, at 807, the interrupt handler restores that task. At the end of the interrupt handler routine, control goes to the highest priority runnable task.

Figure 9:
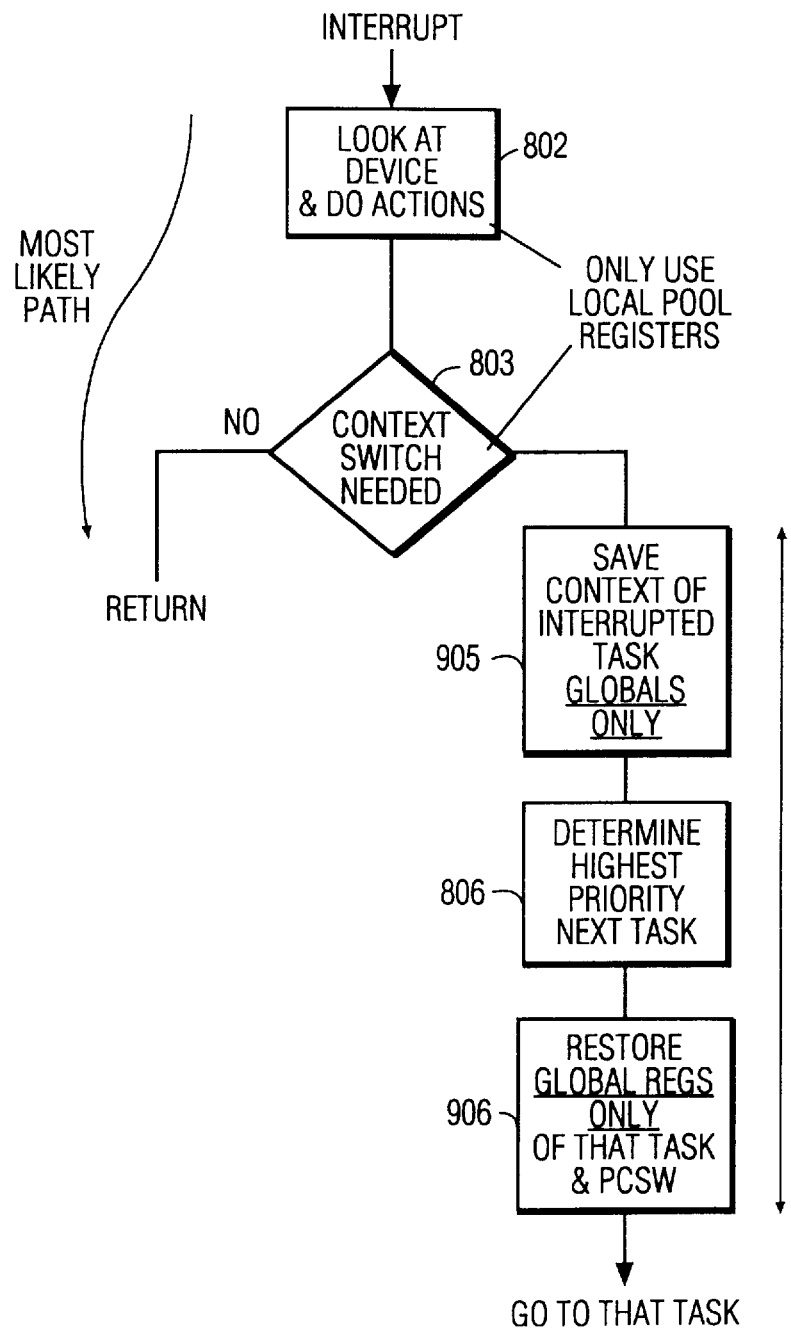
FIG. 9 shows a flow chart of an interrupt handler in accordance with the invention.

A flow chart of an interrupt handler which makes use of the present invention is shown in FIG. 9. Since the interrupt handler can now automatically use the local registers and indeed can restrict itself to using only the local registers, steps 801 and 804 from FIG. 8 are eliminated. Also, since the saved contexts use only the global registers, as explained above, only the global registers need to be restored. The stack and frame pointers from the task record also need to be restored, but these can be stored in the global registers as well.

Thus the invention makes the context switch affordable, because only global values are stored in the task record.

Also, CPU overhead associated with a given interrupt rate is lowered because no registers need to be stored during an interrupt.

Interrupt latency is increased slightly under the invention. To avoid this disadvantage, the compiler or programmer must assure that there is a ceiling on clock cycles between interruptable jumps by inserting sufficient interruptible jumps in the instruction stream. It is suggested as well that each loop should have at least one interruptable jump per iteration and/or that all backwards jumps should be interruptable.

Figure 10:
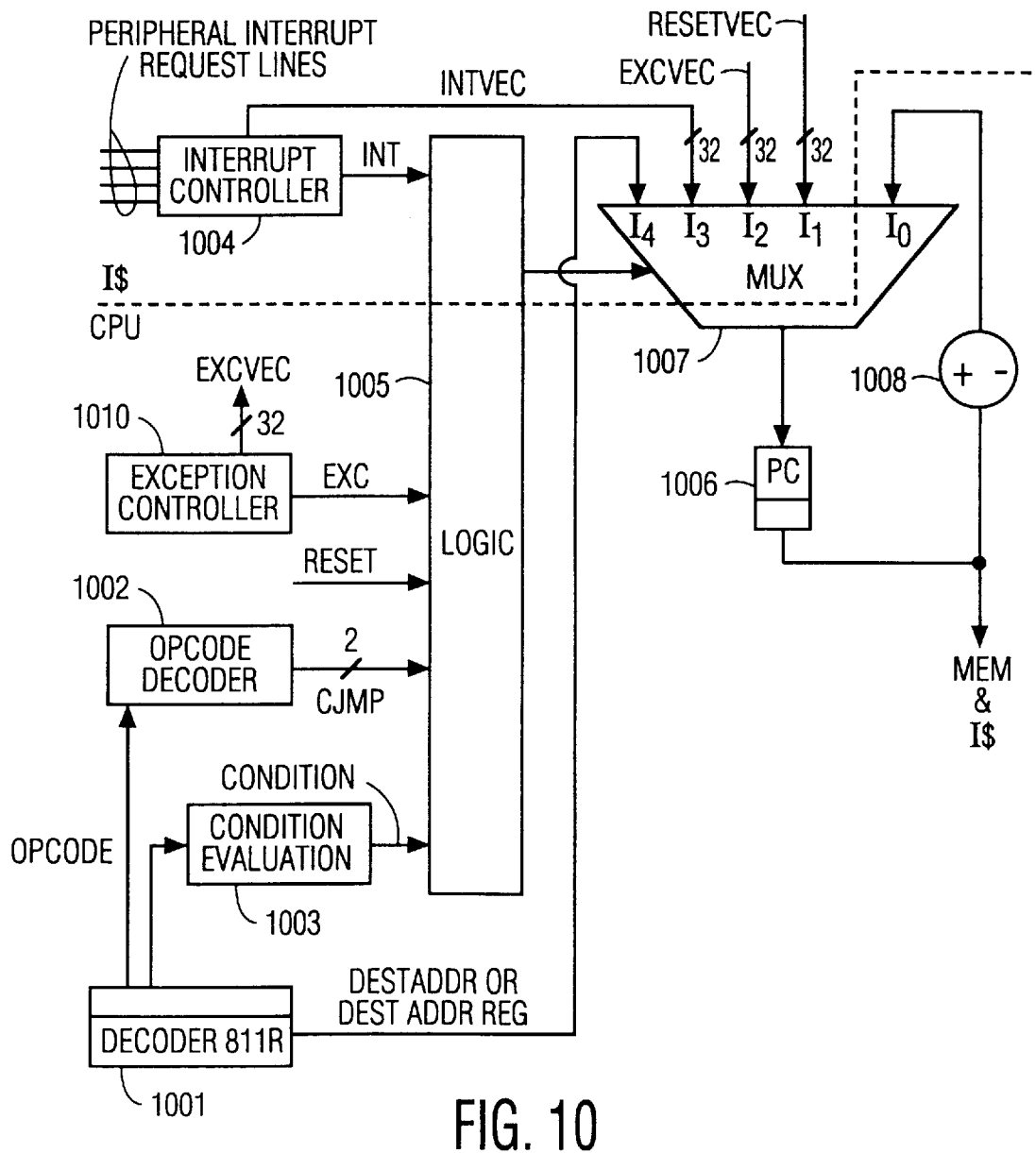
FIG. 10 shows a block diagram of a processor incorporating the jump operations of the invention.

FIG. 10 shows a processor incorporating the jump operations of the invention.

Instructions are decoded at the decoder and instruction register block 1001. This block sends op codes to the op code decoder 1002; conditions to be evaluated to the condition evaluator 1003; and a destination address or destination address register to the multiplexer 1007. The op code decoder 1002 sends a 2 bit value to logic 1005 indicating the type of jump, if any which has been decoded, according to the following table.

| two bit output | interpretation |
| --- | --- |
| 00 | no jump |
| 01 | conditional jump |
| 10 | unconditional jump |

The condition evaluator 1003 determines whether the condition of any conditional jump has been met and gives a true or false result to the logic 1005.

The interrupt controller 1004 receives inputs from the peripherals requesting interrupts. The interrupt controller then creates the interrupt vector INTVEC and provides it to the multiplexer 1007 and an interrupt signal INT to logic 1005.

The exception controller 1010 provides an exception signal EXC to logic 1005 and EXCVEC to multiplexer 1007.

Logic 1005 can be a programmable logic array or other logic according to the state machines of FIGS. 6 and 7.

The multiplexer 1007 chooses contents for the program counter 1006, based on a control signal received from logic 1005. The multiplexer 1007 can choose the destination address or destination address register from the decoder 1001, the interrupt vector from 1004, the exception vector from the exception handler, the reset vector, or the value of the current program counter 1006 incremented at 1008 by one. The value of the current program counter is also stored in a memory or the cache I$.

The designer of the processor may optimize the processor by placing the various gates of the various blocks in whatever places are most convenient. As an example here, a dotted line shows a division of the blocks between the CPU and a cache I$.

I claim:

1. Method for processing an interrupt or an exception in a computer processor, the method comprising the steps of
   a. distinguishing a successful interruptable jump operation, in an instruction stream; and
   b. transferring processor control from the instruction stream to an interrupt or exception handler only in response to such a successful interruptable jump operation.

2. The method of claim 1 further comprising the step of, in the interrupt or exception handler, using only registers from a local pool subset of registers of the processor.

3. The method of claim 1 further comprising the steps of
  in the interrupt or exception handler, distinguishing a need for a context switch other than in the case of a voluntary block; and
  saving contents of registers from a global pool subset of the registers into a task record, while not saving contents of the local pool.

4. The method of claim 1, wherein operations in the instruction stream use registers from a global pool subset of the registers for values which live across decision trees and the local pool for local values.

5. The method of claim 1 wherein jump operations comprise sufficient interruptable jump operations to guarantee a predetermined ceiling on time between assertion of an interrupt or exception and handling of the interrupt or exception.

6. The method of claim 5 wherein loops in the instruction stream contain at least one interruptable jump operation per iteration.

7. The method of claim 6, wherein backwards jumps are implemented using interruptable jump operations.

8. The method of claim 1, wherein the interruptable jump operation is a conditional jump.

9. The method of claim 8, wherein the conditional jump is taken in response to a specified register content being not equal to zero.

10. The method of claim 8, wherein the conditional jump is taken in response to a specified register content being equal to zero.

11. The method of claim 1, wherein interruptable jump is an unconditional jump.

12. Method of claim 1, wherein the instruction stream only contains interruptable jumps between decision trees.

13. Method for processing a context switch in a computer processor, which context switch is due to a reason which is one of a time slice operation or an interrupt freeing a higher priority task, the method comprising the steps of:
  a. determining that a currently executing task is to be suspended, the task being to be suspended for the reason;
  b. loading contents of a global pool subset of registers of the processor in a task record; while not loading contents of a local pool subset; and
  c. suspending the currently executing task.

14. The method of claim 13, wherein the determining step comprises
  a. distinguishing a successful interruptable jump operation, in an instruction stream;
  b. transferring processor control from the instruction stream to an interrupt handler only in response to such a successful interruptable jump operation.

15. The method of claim 14, wherein the currently executing task is from an instruction stream having operations which use registers from the global pool for values which live across decision trees and the local pool for local values.

16. The method of claim 14, wherein operations in the instruction stream use registers from a global pool subset of the registers for values which live across decision trees and the local pool for local values.

17. The method of claim 14, wherein the operations comprise sufficient interruptable jump operations to guarantee a predetermined ceiling on time between assertion of an interrupt and handling of an interrupt.

18. The method of claim 17, wherein loops in the instruction stream contain at least one interruptable jump operation per iteration.

19. The method of claim 18, wherein backwards jumps are implemented using interruptable jump operations.

20. The method of claim 13, wherein the interruptable jump operation is a conditional jump.

21. The method of claim 20, wherein the conditional jump is taken in response to a specified register content being not equal to zero.

22. The method of claim 20, wherein the conditional jump is taken in response to a specified register content being equal to zero.

23. The method of claim 13, wherein interruptable jump is an unconditional jump.

24. Method of claim 23, wherein the instruction stream only contains interruptable jumps between decision trees.

25. A computer processor comprising:
  a. a plurality of registers divided into a global pool subset and a local pool subset;
  b. means for distinguishing a successful interruptable jump operation;
  c. means for receiving interrupts or exceptions; and
  d. an interrupt or exception handler for handling the interrupts or exceptions in response to distinguishing the interruptable jump operation.

26. The processor of claim 25, wherein the interrupt or exception handler only uses registers from the local pool subset.

27. A computer method for handling context switches, the method comprising executing the following steps in a computer processor:
  receiving and processing a stream of instructions comprising a plurality of jump instructions, at least a first one of the jump instructions being marked in the instruction stream as an interruptible jump instruction and at least a second one of the jump instructions not being so marked;
  recognizing a need for a context switch;
  distinguishing the first one of the jump instructions as being marked as interruptible and being successful; and
  transferring processor control from the instruction stream to an interrupt or exception handler only upon such distinguishing.

28. The method of claim 27 wherein,
  jumps marked as interruptible are used for transfer of control between decision trees and
  jumps not marked as interruptible are used for transfer of control within decision trees.

* * * * *